United States Patent [19]

Davison

[11] Patent Number: 4,946,488

[45] Date of Patent: Aug. 7, 1990

[54] VEHICLE-MOUNTED BRUSH CUTTER

[76] Inventor: Timothy A. Davison, 12100 203 Ave., SE., Monroe, Wash. 98272

[21] Appl. No.: 263,258

[22] Filed: Oct. 27, 1988

[51] Int. Cl.$^5$ .............................................. A01D 34/03
[52] U.S. Cl. ........................................ 56/14.9; 56/255
[58] Field of Search .................... 56/10.7, 10.8, 255, 56/15.2, 15.9

[56] References Cited

U.S. PATENT DOCUMENTS

| Re. 31,930 | 7/1985 | Luick | 56/16.9 |
|---|---|---|---|
| 4,026,092 | 5/1977 | Wehde | 56/14.3 |
| 4,203,277 | 5/1980 | Kaetzel | 56/370 |
| 4,322,940 | 4/1982 | White | 56/12.9 |
| 4,502,269 | 3/1985 | Cartner | 56/15.2 |
| 4,509,315 | 4/1985 | Giguere | 56/255 |
| 4,665,683 | 5/1987 | Paolucci | 56/16.9 |
| 4,693,065 | 9/1987 | Aron | 56/377 |
| 4,769,977 | 9/1988 | Milbourn | 56/255 |
| 4,802,327 | 2/1989 | Roberts | 56/255 |

Primary Examiner—Jerome W. Massie
Assistant Examiner—Gay Ann Spahn
Attorney, Agent, or Firm—Dowrey, Cross & Cole

[57] ABSTRACT

A heavy duty brush cutting machinery having vehicle mounted brush cutters mounted on a boom extending outwardly from the vehicle. The cutter head assembly is comprised of a generally circular rotary cutter blade, a blade-rotating motor and drive shaft, and a semi-circular cutter blade shroud mounting the motor and the drive shaft. The shroud is comprised of a top deck mounting the blade, motor and drive shaft. The top deck has a first peripheral edge encompassing an obtuse arc, a second segmental edge lying radially outwardly from the first edge and non-radially across the plane of the underlying cutter blade, and a third segental edge extending from the first edge and intersecting the second edge at an obtuse angle. The shroud includes an anvil cutting edge provided at the leading edge of the top deck's third segmental edge to sever or dislodge oversized objects from the blade before the object can be carried into the shroud enclosure.

9 Claims, 2 Drawing Sheets

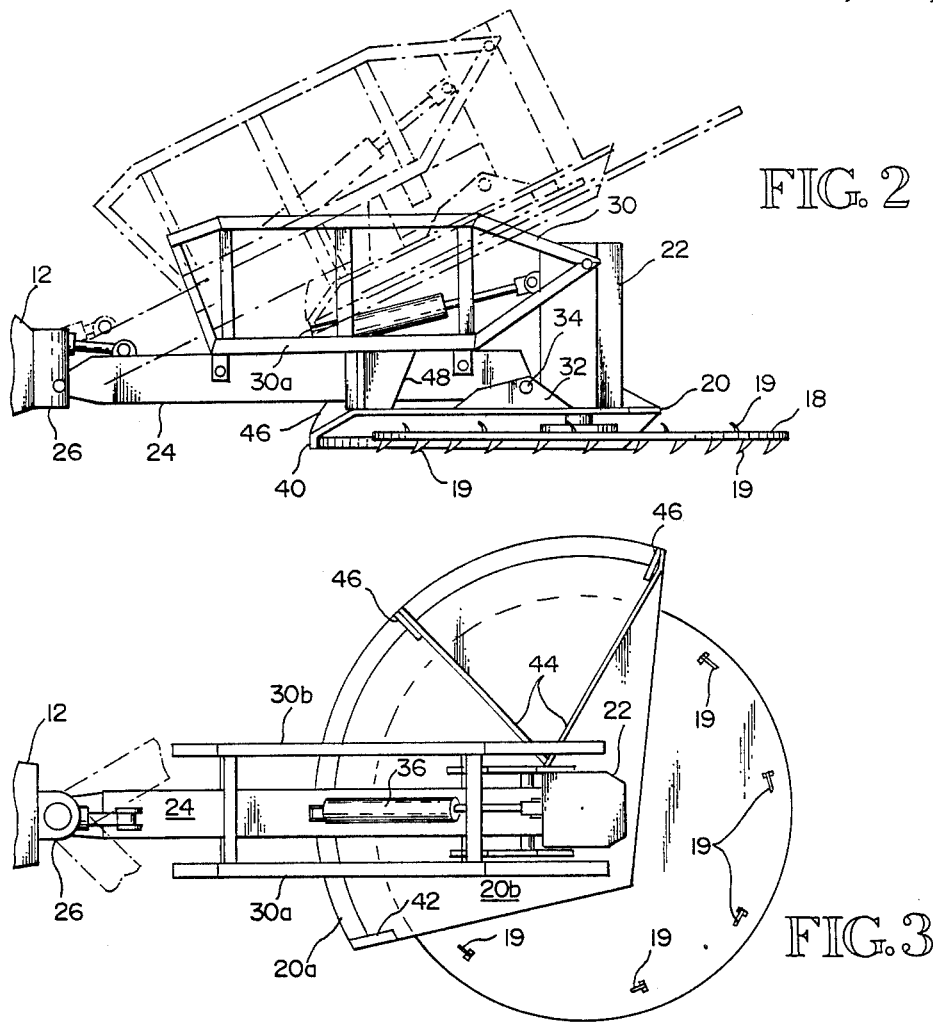
FIG. 2
FIG. 3
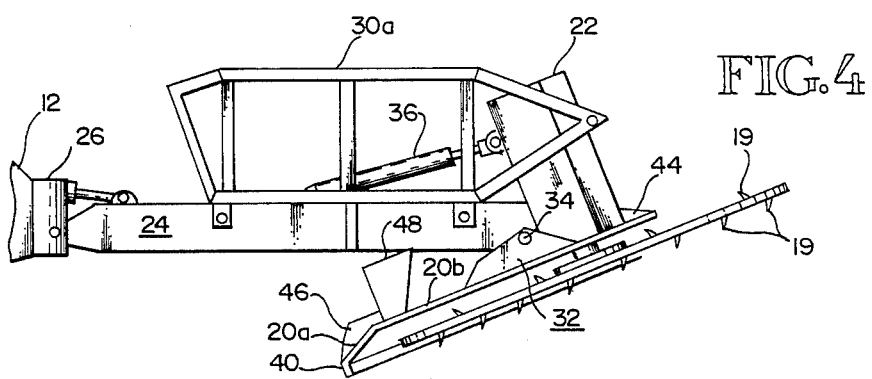
FIG. 4

VEHICLE-MOUNTED BRUSH CUTTER

FIELD OF THE INVENTION

This invention relates to heavy duty brush cutting machinery and particularly to vehicle-mounted brush cutters.

BACKGROUND OF THE INVENTION

Heavy duty, commercial brush cutters have been used in connection with forestry management, right-of-way clearing and maintainance, and for similar purposes. These brush cutters are typically heavy steel rotary circular blades that are mounted on tracked or rubber-tired vehicles. The brush cutter blade is typically powered hydraulically. An exemplary prior art blade may be six feet in diameter, weigh several hundred pounds, and contain upper and lower cutting teeth. Such a blade can thus cut brush from its upper and lower surfaces as well as its periphery.

Cutter blades of such a size build up substantial momentum during operation and can easily snag a log or limb and hurl it a great distance. To minimize the hazzard of operating or being in the vicinity of this type of cutter blade, some brush cutters have incorporated a protective shroud. These shrouds leave only part of the blade exposed so that peripheral cutting can occur. However, the shroud can become plugged with a log or limb that is picked up by the cutter blade and wedged between the blade and the shroud. The resulting impact force on the shroud and on the blade-mounting apparatus can cause significant damage to these parts up to and including a breakdown.

SUMMARY OF THE INVENTION

A major object of the present invention is to provide a brush cutter of the rotary blade type that incorporates a protective shroud for the blade. The protective shroud of the present invention overlays a portion of the blade and peripherally encloses that blade portion. The shroud is oriented such that the front portion of the blade is exposed, for peripheral cutting as the blade is moved forwardly, and one side portion of the blade is also exposed, for side cutting as the blade is moved laterally. The lateral opening is on the side of the cutter apparatus where a point on the cutter blade rotates from front to back. Viewed from above, a cutter blade clockwise rotation would dictate that the right side of the cutter blade would be exposed. The shroud thus overlays the rear and lefthand portions of the cutter blade. The shroud of this invention is provided with a cutting anvil adjacent the cutter blade periphery where the blade rotates rearwardly into the shroud; termed herein the "leading end" of the shroud. An anvil cutting edge is provided at this "leading end" to sever any logs or limbs that are picked up by the cutter blade before they are carried into the shroud's enclosure.

This an other objects and advantages of the brush cutter of this invention will become apparent from the following detailed description of the invention.

BRIEF DESCRIPTION OF THE DRAWINGS

FIG. 2 is a righthand side view in elevation of the brush cutter of this invention, illustrating the range of vertical movement of the brush cutter-mounting boom;

FIG. 3 is a top plan view of the FIG. 2 brush cutter, illustrating the range of lateral movement of the brush cutter-mounting boom, and also depicting the relationship of the cutter blade to the cutter shroud;

FIG. 4 is a righthand side view, similar to FIG. 2, but illustrating the pivotal movement of the brush cutter relative to its mounting boom.

DETAILED DESCRIPTION OF THE INVENTION

Figure 1:
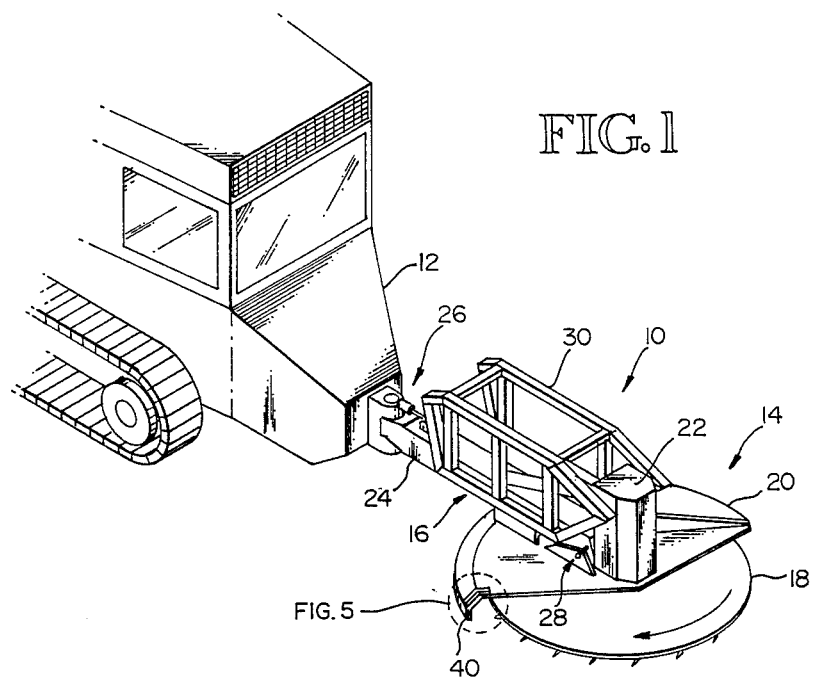
FIG. 1 is a perspective view of the brush cutter of this invention mounted on a tracked vehicle.

The brush cutter 10 of this invention is depicted as mounted on a tracked vehicle 12. It comprises a cutter head 14 mounted on a cutter bottom 16. Boom 16 is, in turn, mounted on the front of the tracked vehicle 12. The cutter head comprises a generally circular rotary blade 18, a cutter blade shroud 20, and a hydraulic blade-rotating motor housed in motor housing 22. The boom 16 comprises a tubular member 24, pivotally attached to vehicle 10 at 26 and to cutter head 14 at 28, and a lattice member 30 mounted along the top of tubular member 24. The attachment 26 between vehicle 12 and the inner end of boom member 24 enables the boom to pivot vertically as well as horizontally, in a well known manner, under the control of appropriate hydraulic cylinders connected between the vehicle and boom member 24. Likewise, the attachment 28 between the outer end of boom member 24 and the cutter head enables the cutter head to pivot, in a vertical plane relative to the boom 16, in a well known manner. These movements are illustrated in FIGS. 2–4.

In a well known manner, the cutter blade 18 is mounted to a perpendicular drive shaft 19 that extends through the shroud 20 and into the motor housing 22 where it is connected to an appropriate hydraulic drive motor. Motor housing 22 is mounted on the upper surface of the shroud 20. The attachment 28 between the outer end of boom member 24 and the cutter head is provided by a pair of mounting plates 32 that are also mounted to the upper surface of the shroud 20. The mounting plates of the pair 32 are spaced apart sufficient to bracket the outer end of the boom member 24 and are pivotally connected thereto by a load-bearing pivot pin 34. A hydraulic cylinder 36 is pivotally mounted to the upper side of boom member 24 and to the upper end of housing member 22 to effect pivoting of the cutter head relative to its mounting boom.

Hydraulic lines to operate the cutter motor within motor housing 22 and the hydraulic cylinder 36 must extend from the vehicle 12 out along the boom 16. The lattice member 30 comprises a pair of structural lattices 30a and 30b that are appropriately secured to and set atop the tubular boom member 24. The hydraulic lines extend between the lattices 30a and 30b and are protected. Likewise, the hydraulic cylinder 36 is protected by the lattices 30a and 30b. The forward ends of the lattices 30a and 30b come to a point, as shown, and extend along side of the motor housing 22 to protect it and to guide brush around it. When the cutter head is pivoted about pin 34, the motor housing 22 will shift upwardly and rearwardly between the lattices 30a and 30b, as seen in FIG. 4, further shielding the motor housing from surrounding brush and the like.

Figure 5:
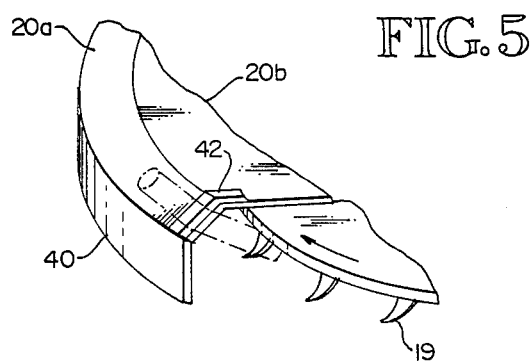
FIG. 5 is a detailed view of the shroud and cutter blade illustrating the function of the shroud-mounted anvil blade at the "leading end" of the shroud.

The shroud 20 comprises a semi-circular steel top deck that encompasses an arc of about 100 degrees. The periphery of the top deck is angled downward at about 45 degrees from the top deck to provide a semi-annular rim 20a that, together with the coplanar upper top deck surface 20b, defines the shroud enclosure within which the cutter blade 18 is located. A flexible guard 40, fabricated of a durable material such as rubber belting, is attached to the bottom edge of the top deck rim. Guard 40 depends from the top deck rim and constitutes a debris-blocking skirt for the cutter head. The leading edge of the top deck, shown in enlarged detail in FIG. 5, is provided with an anvil edge 42. This edge 42 is provided at a point just above the outer edge of the blade 18 and extends outward to the outer edge of top deck rim where it joins the skirt 40. This anvil edge is tapered back from the leading edge of the top deck and thus provides a knife edge. The anvil edge is preferably provided as a tapered strip of reinforcing steel that is welded to the steel top deck. The blade, typically provided with a plurality of teeth 19 on its upper and lower surfaces, may pick up a log or branch and, during operation, carry the debris into the shroud enclosure. If that debris extends outward beyond the top deck outer rim, it will strike the anvil edge 42 and be severed. The anvil edge portion along the upper deck 20b wouuld sever an object too high to fit between the blade and the top deck. The anvil edge portion along the rim 20a would sever an object too long to fit between the blade and the outer perihery of the shroud. These features help prevent a large object from entering the shroud enclosure and becoming wedged between the shroud and the blade. Consequently, the large forces that would impact the structural integrity of the cutter head as a result of such an object becoming trapped and wedged is greatly reduced.

The central, co-planar, disk-like portion of the top deck is reinforced by a plurality of radially-extending reinforcing ribs 44. These ribs extend across the top of the top deck from the vicinity of the motor housing 22 to the commencement of the outer rim. Additionally, rim reinforcing plates 46 are welded to the the outer surface of the rim adjacent each rib 44. These stiffen the top deck.

Behind the motor housing 22, toward the rear of the top deck, a pair of stabilizers 48 are welded to the top deck coplanar surface 20b. The stabilizers are spaced apart so that the lower, tubluar boom member 24 will fit between them when the cutter head is placed in the position shown in FIG. 2, a position where it is parallel with the boom. These stabilizers bear against the side of boom member 24 and thus help resist lateral forces imposed on the cutter head by transferring those forces to the boom itself. This feature reduces wear and tear on the mounting pin 34 that joins the cutter head to the boom assembly. The stabilizers also bear against the boom structure to serve as positive stops when the cutter head is hydraulically brought to its FIG. 2 position.

While the preferred embodiment of the invention has been described herein, variations in the design may be made. The scope of the invention, therefore, is only to be limited by the claims appended hereto.

The embodiments of the invention in which an exclusive property is claimed are defined as follows:

I claim:

1. A vehicle-mounted brush cutting apparatus which comprises a vehicle having boom means extending outward therefrom for mounting a cutter head assembly on the outer end thereof; a cutter head assembly mounted to the end of said vehicle boom means, the cutter head assembly comprising a generally circular rotary cutter blade, a blade-rotating motor and a drive shaft means, and a semi-circular cutter blade shroud mounting said motor and drive shaft means; said shroud comprising a top deck mounting said blade and motor and drive shaft means with said blade generally coplanar with and positioned a distance below said top deck, said top deck having a first peripheral edge lying in a plane generally parallel to the plane of the rotary cutter blade encompassing an obtuse arc, a second segmental edge lying radially outwardly from said first edge and non-radially across the plane of the unerlying cutter blade, and a third segmental edge extending from said first edge and intersecting the second edge at an obtuse angle, said first peripheral edge being set outward from the outer edge of said blade to define an enclosure bounded by said first, second and third edges within which said blade rotates; cutter mounting means for connecting said cutter head assembly to said boom means, comprising mounting bracket means attached to said boom means and attached to said top deck at a location whereby said shroud is positioned to locate said top deck in rear and side quadrants, with respect to said motor and drive shaft means, so that said cutter blade is exposed for cutting in said front and opposite side quadrants with said second segmental edge being oriented across the front of said shroud in front of said motor and drive shaft means and with said third segmental edge being oriented along said opposite side of said shroud; power means for operating said motor and drive shaft means to cause said cutter blade to rotate toward said third segmental edge; and said shroud including an anvil cutting edge provided at the leading end of said top deck third segmental edge and positioned whereby an oversized object carried by said blade will strike said anvil cutting edge and be severed or dislodged from said blade before such object is carried into the shroud enclosure.

2. The apparatus according to claim 1 wherein said top deck first peripheral edge comprises a downwardly inclined rim portion with said anvil cutting edge further extending along the leading end of said rim portion.

3. The apparatus according to claim 2 wherein said shroud includes a peripheral flexible skirt depending from said top deck rim portion.

4. The apparatus according to claim 1 where said cutter head assembly includes a motor housing containing said motor and drive shaft means above said shroud, and said boom means includes a lattice framework means mounted to at least a portion of said boom means and extending longitudinally of said boom means over said shroud and along each side of said motor housing to encompass and protect said motor housing.

5. The apparatus according to claim 4 wherein said top deck first peripheral edge comprises a downwardly inclined rim portion with said anvil cutting edge further extending along the leading end of said rim portion.

6. The apparatus according to claim 5 wherein said shroud includes a peripheral flexible skirt depending from said top deck rim portion.

7. The apparatus according to claim 4 wherein said cutter mounting means pivotally mounts said cutter head assembly to said boom means, and includes actuating means connected between said boom means and said motor housing to pivot said cutter head assembly upward and downward about an axis normal to said boom means, said actuating means being positioned within said lattice framework means whereby pivoting of said cutter head assembly will cause said motor housing to tilt into said lattice housing means for added protection.

8. The apparatus according to claim 7 wherein said shroud includes a pair of stabilizer members attached to said top deck and positioned to straddle said boom means when said cutter blade is aligned generally coplanar with said boom means whereby said stabilizer means will engage said boom means to transfer lateral forces imposed on said cutter assembly to said boom means.

9. The apparatus according to claim 8 wherein said stabilizer members extend normal to said top deck toward said boom means whereby said stabilizer members will contact said boom means when said cutter assembly is pivoted downward to limit the extent of such downward movement.

* * * * *